(12) United States Patent
Fox et al.

(10) Patent No.: US 7,972,415 B2
(45) Date of Patent: Jul. 5, 2011

(54) MEMBRANE-BASED COMPRESSED AIR BREATHING SYSTEM

(75) Inventors: Timothy J. Fox, Waynesburg, PA (US); Mark F. Honath, McKees Rocks, PA (US)

(73) Assignee: SPX Corporation, Charlotte, NC (US)

(*) Notice: Subject to any disclaimer, the term of this patent is extended or adjusted under 35 U.S.C. 154(b) by 301 days.

(21) Appl. No.: 12/332,709

(22) Filed: Dec. 11, 2008

(65) Prior Publication Data

US 2010/0150773 A1   Jun. 17, 2010

(51) Int. Cl.
*B01D 53/22* (2006.01)
*A62B 7/10* (2006.01)

(52) U.S. Cl. ........ 95/45; 95/52; 95/143; 95/273; 96/4; 96/8; 96/10; 96/111; 96/417; 55/315; 422/4; 422/119; 422/122; 423/247; 128/205.12; 128/205.29

(58) Field of Classification Search .......... 96/4, 8, 96/10, 108, 109, 111, 413, 417; 95/45, 52, 95/143, 273; 422/4, 119, 122; 423/246, 423/247, 437.2; 128/200.24, 205.12, 205.27, 128/205.29; 55/385.1, 315, 482, DIG. 17
See application file for complete search history.

(56) References Cited

U.S. PATENT DOCUMENTS

| | | | |
|---|---|---|---|
| 4,448,757 A * | 5/1984 | Barnwell et al. | 423/247 |
| 4,537,748 A * | 8/1985 | Billiet | 422/122 |
| 4,537,760 A | 8/1985 | Lavie | |
| 4,681,745 A | 7/1987 | Pinto | |
| 4,746,338 A * | 5/1988 | Williams | 422/119 |
| 4,990,632 A | 2/1991 | Ramachandran et al. | |
| 5,008,412 A | 4/1991 | Ramachandran et al. | |
| 5,008,414 A | 4/1991 | Ramachandran et al. | |
| 5,034,025 A | 7/1991 | Overmann, III | |
| 5,169,412 A | 12/1992 | Prasad et al. | |
| 5,282,969 A | 2/1994 | Xu | |
| 5,354,547 A | 10/1994 | Rao et al. | |
| 5,435,836 A | 7/1995 | Anand et al. | |
| 5,532,384 A | 7/1996 | Shirley et al. | |
| 5,641,337 A | 6/1997 | Arrowsmith et al. | |
| 5,679,133 A | 10/1997 | Moll et al. | |
| 5,753,010 A | 5/1998 | Sircar et al. | |
| 5,755,855 A | 5/1998 | Baker et al. | |
| 5,837,032 A | 11/1998 | Moll et al. | |
| 5,837,125 A | 11/1998 | Prasad et al. | |
| 5,843,209 A | 12/1998 | Ray et al. | |
| 5,868,992 A | 2/1999 | Roman | |
| 5,888,272 A | 3/1999 | Prasad et al. | |
| 5,944,874 A | 8/1999 | Prasad et al. | |
| 5,979,178 A | 11/1999 | Engler et al. | |

(Continued)

*Primary Examiner* — Jason M Greene
(74) *Attorney, Agent, or Firm* — Baker & Hostetler LLP

(57) ABSTRACT

A breathing air purification device and method having a carbon-monoxide free sweep stream. Water vapor is removed from a compressed air stream using a membrane dryer, comprising, a membrane having a permeate portion and a non-permeate portion, a membrane housing which encases the membrane, a membrane feed inlet conduit connected to the membrane and a non-permeate gas outlet conduit fluidly connected to the non-permeate portion of the membrane. The sweep stream used to cleanse the outer permeate portion of the membrane dryer is taken from a catalyst filter. The catalyst filter includes a cartridge containing a bed of catalyst, two end pieces maintaining the cartridge within a catalyst bed housing and having outlet holes, a catalyst inlet conduit connected to the bed of catalyst and a product gas outlet conduit connected to the outlet holes. A sweep inlet tube provides a gas connection from the catalyst filter component to the permeate portion of the membrane.

25 Claims, 2 Drawing Sheets

U.S. PATENT DOCUMENTS

| | | | |
|---|---|---|---|
| 5,980,858 A | 11/1999 | Fujimura et al. | |
| 6,010,614 A | 1/2000 | Keskar et al. | |
| 6,039,792 A | 3/2000 | Calamur et al. | |
| 6,040,460 A | 3/2000 | Bertola et al. | |
| 6,059,857 A * | 5/2000 | Ray et al. | 95/52 |
| 6,077,323 A | 6/2000 | Nataraj et al. | |
| 6,133,328 A | 10/2000 | Lightner | |
| 6,149,714 A | 11/2000 | Kobayashi | |
| 6,179,900 B1 | 1/2001 | Behling et al. | |
| 6,187,196 B1 | 2/2001 | Way et al. | |
| 6,190,436 B1 | 2/2001 | Ji et al. | |
| 6,214,066 B1 | 4/2001 | Nataraj et al. | |
| 6,258,860 B1 | 7/2001 | Weedon et al. | |
| 6,293,084 B1 | 9/2001 | Drnevich et al. | |
| 6,303,092 B1 | 10/2001 | Anand et al. | |
| 6,340,581 B1 | 1/2002 | Gaddy | |
| 6,360,524 B1 | 3/2002 | Drnevich et al. | |
| 6,361,582 B1 | 3/2002 | Pinnau et al. | |
| 6,361,583 B1 | 3/2002 | Pinnau et al. | |
| 6,379,431 B1 | 4/2002 | Xu et al. | |
| 6,406,518 B1 | 6/2002 | Bonaquist et al. | |
| 6,415,642 B1 | 7/2002 | Crapo et al. | |
| 6,454,838 B1 | 9/2002 | Xu et al. | |
| 6,455,011 B1 | 9/2002 | Fujimura et al. | |
| 6,517,791 B1 | 2/2003 | Jaynes | |
| 6,531,105 B1 | 3/2003 | Giacobbe et al. | |
| 6,719,825 B2 * | 4/2004 | Wedge et al. | 95/52 |
| 6,767,527 B1 | 7/2004 | Åsen et al. | |
| 6,783,749 B2 | 8/2004 | Narasimhan et al. | |
| 6,783,750 B2 | 8/2004 | Shah et al. | |
| 6,814,780 B2 * | 11/2004 | Bikson et al. | 95/52 |
| 6,881,759 B2 | 4/2005 | Nielsen et al. | |
| 6,896,717 B2 | 5/2005 | Pinnau et al. | |
| 7,141,231 B2 | 11/2006 | Grace et al. | |
| 7,294,172 B2 | 11/2007 | Baksh et al. | |
| 7,314,502 B2 | 1/2008 | Kelley | |
| 7,648,566 B2 * | 1/2010 | Wei et al. | 96/4 |
| 2002/0007101 A1 | 1/2002 | Senetar et al. | |
| 2003/0041518 A1 | 3/2003 | Wallace et al. | |
| 2005/0113463 A1 | 5/2005 | O'Rear et al. | |
| 2007/0017368 A1 | 1/2007 | Levan et al. | |
| 2007/0017369 A1 | 1/2007 | LeVan et al. | |
| 2007/0240565 A1 | 10/2007 | Doong et al. | |
| 2007/0245698 A1 | 10/2007 | Lomax, Jr. et al. | |
| 2008/0141858 A1 | 6/2008 | Liu et al. | |

* cited by examiner

MEMBRANE-BASED COMPRESSED AIR BREATHING SYSTEM

FIELD OF THE INVENTION

This invention relates generally to a membrane-based compressed air breathing system and method. More particularly, the present invention relates, for example, to a membrane separator utilizing a purified external sweep stream.

BACKGROUND OF THE INVENTION

It is known in the art that compressed air, which has several uses including in breathing air systems, food packaging, pharmaceutical labs and integrated circuit manufacturing, may be treated to remove contaminants and water vapor. Compressed Breathing Air (CBA) may be produced by a breathing air purification system (BAPS). A BAPS may be employed for two primary functions: (i) dehydration to remove excess moisture from untreated air and (ii) purification to remove solid particles, oil aerosols and hydrocarbon vapors from untreated air. The purification function of the BAPS may also be configured to convert carbon monoxide to carbon dioxide.

Portable and stationary BAPS may be used to supply purified CBA to masks, helmets and hoods. CBA systems may be used to provide breathing quality air to workers engaged in tasks like firefighting, sandblasting, spray painting, chemical spill clean-up, welding, grinding, pipe and tank cleaning and similar activities where repeat exposure to untreated air can pose a health threat. Federal regulations require that CBA be used in environments where untreated air may produce physical discomfort immediately, chronic poisoning after repeat exposure, or acute adverse physiological symptoms after prolonged exposure.

Conventional BAPS typically utilize desiccant or refrigerated dryer technology to dehydrate the compressed air. Both of these devices are not very portable and require electricity or complicated and expensive pneumatic controls to operate. It is desired to provide BAPS having enhanced portability and reduced manufacturing costs while eliminating the need for any external utility (other than compressed air) while removing water, liquid oils, liquid contaminants, oil vapor, carbon monoxide and detectable odors from compressed air.

Furthermore, some conventional BAPS, such as those utilizing desiccant dryers, require sweep (purge) air for efficient operation. If this sweep air is taken from a point in the system prior to purification of the air, the sweep air may contain deadly contaminants, such as carbon monoxide. The sweep air is then expelled from the system into the immediate environment, potentially contaminating the surroundings. It is desired to provide BAPS which produces Occupational Safety and Health Act (OSHA)-quality Grade D breathing air without contaminating the installed area or immediate environment of the system.

SUMMARY OF THE INVENTION

The foregoing needs are met, to a great extent, by the present invention, wherein in one embodiment a breathing air purification system may be utilized to provide OSHA-quality Grade D breathing air with a membrane sweep exhaust stream which does not contaminate the installed area of the BAPS. This improved BAPS is accomplished by utilizing a membrane dryer with a purified external sweep stream. The sweep inlet is taken downstream of the membrane dryer after treatment in a catalytic filter which removes carbon monoxide (CO) from the sweep inlet stream.

In example embodiments of the invention, a breathing air purification device may be used having a carbon-monoxide free sweep stream. Water vapor is removed from a compressed air stream using a membrane dryer, comprising, a membrane having a permeate portion and a non-permeate portion, a membrane housing which encases the membrane, a membrane feed inlet conduit connected to the membrane and a non-permeate gas outlet conduit fluidly connected to the non-permeate portion of the membrane. A transfer tube in a center portion of the membrane may be used for transferring a portion of the non-permeate product gas from the non-permeate portion of the membrane to the non-permeate gas outlet conduit. In some embodiments, a filter mounting bracket is used to mount the membrane separation component. To enable an external sweep stream, the membrane housing may incorporate a "T-style" filter housing.

The sweep stream used to cleanse the outer permeate portion of the membrane dryer may be taken from a catalyst filter. The catalyst filter includes a cartridge containing a bed of catalyst, two end pieces maintaining the cartridge within a catalyst bed housing and having outlet holes, a catalyst inlet conduit connected to the bed of catalyst and a product gas outlet conduit connected to the outlet holes. In some embodiments, the catalyst filter includes a moisture indicator device and a plugged port for the optional addition of a carbon monoxide monitoring device by the user.

In example embodiments, a sweep inlet tube or conduit provides a gas connection from the catalyst filter component to the permeate portion of the membrane. Accordingly, a sweep gas stream, substantially free of carbon monoxide, flows from the catalyst filter component to the membrane separation component. The breathing air purification device may also include a sweep inlet conduit within the membrane housing. The breathing air purification device may further comprise a sweep orifice for metering an amount of gas which enters the permeate portion of the membrane. In some embodiments, a filter mounting bracket is used to mount the catalyst filter component. In some embodiments of the invention, a sweep filter, such as a sintered bronze filter, is fluidly connected to the sweep inlet tube. In example embodiments, a pipe-threaded catalyst fitting interlaces with the catalytic bed housing creating a fitted seal and an adapter fitting maintaining a connection between the pipe threading of the catalyst fitting and the sweep inlet tube.

In some embodiments of the invention, pre-filters may be used to treat compressed air before it is treated in the membrane dryer. As such, the BAPS may include at least one pre-filter located upstream of the membrane separation component. The breathing air purification device may further comprise an activated carbon filter located downstream of the catalyst filter and a particulate filter located downstream of the activated carbon filter.

In example embodiments of the invention, a breathing air purification device having a carbon-monoxide free sweep stream may be provided, including: membrane separation means, having a separation means for separating a permeate portion from a non-permeate portion, encasement means for encasing said separation means, feed inlet means for carrying a feed gas into the device and a non-permeate product gas outlet means for carrying non-permeate product gas out of the membrane separation means. The device may further include catalyst filter means, having cartridge means for encasing a bed of catalyst, end pieces means for maintaining the cartridge within a catalyst bed housing and having outlet means for carrying a catalyst-treated outlet gas out of the catalyst filter means and catalyst inlet means for introducing the non-permeate product gas into the bed of catalyst. The device also includes a sweep inlet means for providing a gas connection from the catalyst filter component to the permeate portion of the membrane.

In an embodiment of the present invention, a method of using a breathing air purification device includes removing water vapor from a compressed air stream using a membrane separation component, comprising: carrying the compressed air stream into the device; separating a permeate portion from a non-permeate portion of the compressed air stream; and carrying a non-permeate gas out of the membrane separation component. The method also includes removing carbon monoxide from the non-permeate gas using a catalyst filter component by: maintaining a cartridge within a catalyst bed housing end pieces having outlet holes for carrying a catalyst-treated gas out of the catalyst filter component; and introducing the non-permeate gas into a bed of catalyst housed within the cartridge. Lastly, the method may include transferring the catalyst-treated gas from the catalyst filter component to the permeate portion of the membrane via a sweep inlet conduit such that the catalyst-treated gas is substantially free of carbon monoxide.

There has thus been outlined, rather broadly, certain embodiments of the invention in order that the detailed description thereof herein may be better understood and in order that the present contribution to the art may be better appreciated. There are, of course, additional embodiments of the invention that will be described below and which will form the subject matter of the claim appended hereto.

In this respect, before explaining at least one embodiment of the invention in detail, it is to be understood that the invention is not limited in its application to the details of construction and to the arrangements of the components set forth in the following description or illustrated in the drawings. The invention is capable of embodiments in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

DETAILED DESCRIPTION

Example embodiments of the invention may be used to prevent contamination of the installed area for a breathing air purification system (BAPS). BAPS, in accordance with the present invention, may be membrane-based to allow for a more compact and electricity-saving dehydration process. Example embodiments of the invention utilize either a desiccant or membrane, which require sweep air. For example, to desorb the water vapor from the membrane fibers, membrane dryers use a portion of the dried compressed air to flush the water vapor from the outer/permeate side of the hollow fibers and thus, sweep the membrane of water vapor. In example embodiments of the invention, sweep air is taken from a point in the system after the dried air is treated in a catalyst bed, which converts deadly carbon monoxide (CO) to carbon dioxide. This essentially CO-free sweep air may then be safely expelled from the system into the immediate environment, without contaminating the surroundings.

Figure 1:
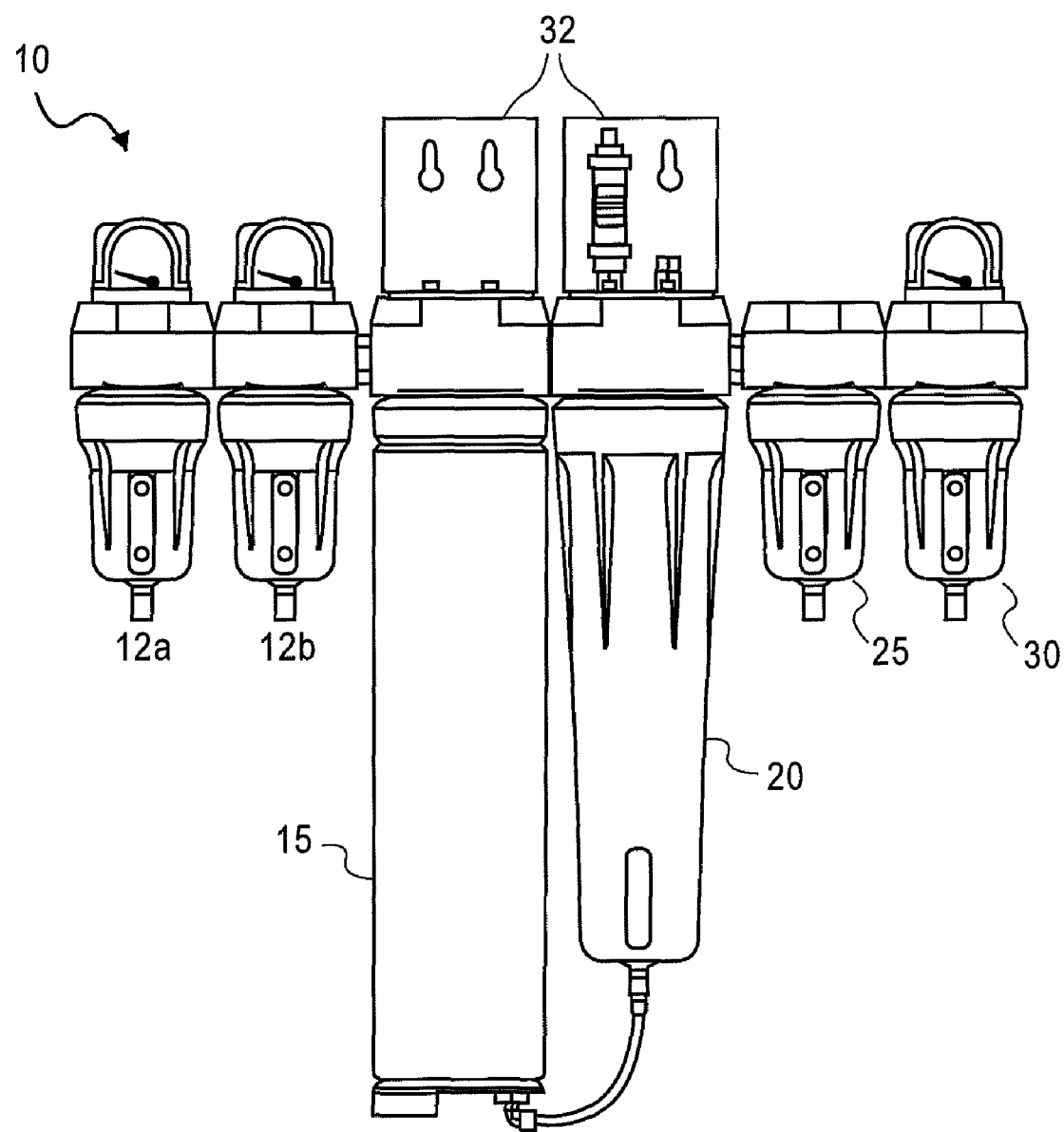
FIG. 1 is a plan view illustrating a breathing air purification system in accordance with an example embodiment of the present invention.

The invention will now be described with reference to the drawing figures. FIG. 1 is a plan view illustrating a breathing air purification system (BAPS) 10 in accordance with an example embodiment of the present invention. As shown in FIG. 1, example embodiments of a membrane-based BAPS 10 may include: (i) two inlet pre-filters 12a, 12b to remove bulk liquids, mainly water and oil; (ii) membrane separation component, such as a membrane dryer 15, to reduce relative humidity of the compressed air; (iii) catalyst filter 20 to convert any carbon monoxide present to carbon dioxide; (iv) activated carbon filter 25 to adsorb oil vapors and detectable odors; (v) particulate filter 30 to capture any entrained small catalyst or carbon fines and; (vi) optional filter mounting brackets 32.

Figure 2:
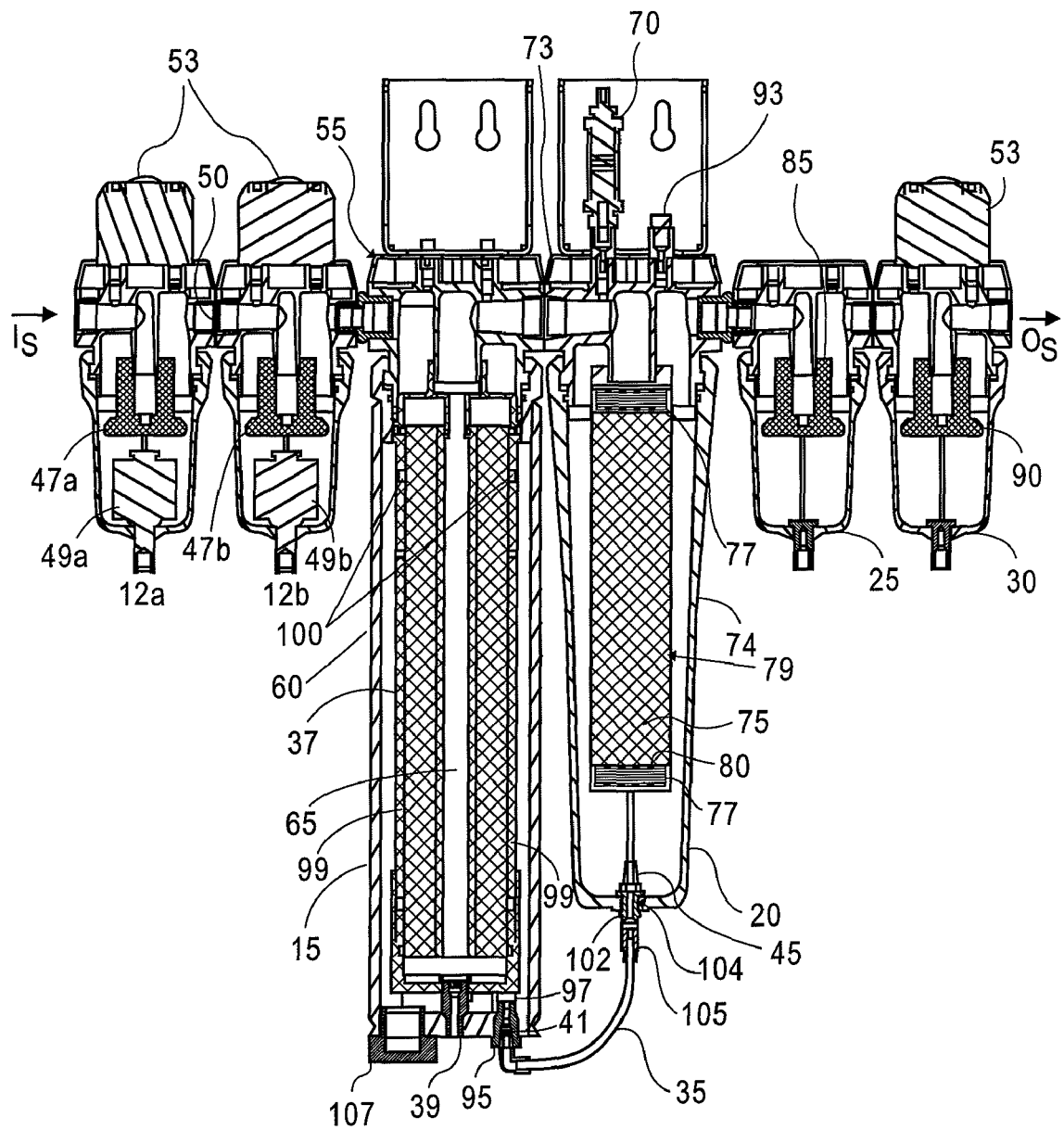
FIG. 2 provides a cross-sectional view of the breathing air purification system of FIG. 1.

FIG. 2 provides a cross-sectional view of the membrane-based BAPS 10 of FIG. 1. Cleaning compressed air using membrane dryer 15 removes contaminants and water vapor and also, reduces its dew point, which is the temperature to which the air must be cooled, at constant barometric pressure, for the water vapor component to condense into water. The membrane dryer 15 may be used to reduce the relative humidity to 3% or lower. Compressed air may be moved through a membrane 37 including a bundle of hollow fibers which are specifically designed to remove water vapor. Thus, as compressed air passes through the membrane 37, the water vapor is absorbed on the inside of the fibers and passes quickly to the outer layers of the membrane 37. A membrane bundle center fitting 39 acts to center the membrane bundle 37 within its housing 60.

In example embodiments of the present invention, compressed air containing water vapor and other impurities enters the BAPS through inlet stream $I_s$. Conventional pre-filters may be used to treat compressed air before it is treated in the membrane dryer 15. The inlet stream $I_s$ enters the first pre-filter 12a, which removes bulk liquids and particulates. The first pre-filter 12a includes a course filter element 47a designed to withstand high liquid load. Liquids are discharged from pre-filter 12a via a float drain 49a. The stream then enters the second pre-filter 12b, which removes liquids and particulates to a higher efficiency. The second pre-filter 12b includes a finer filter element 47b which can remove aerosols. More liquids are discharged from pre-filter 12b via another float drain 49b. A modular connecting kit 50 may be used to create a seal between different components of the BAPS, such as between the first and second pre-filters 12a, 12b. Additionally, each pre-filter 12a, 12b includes a differential pressure gage 53 to indicate when the pre-filter elements 47a, 47b need to be replaced.

The stream exiting the second pre-filter then enters the membrane head 55 of the dryer 15. The compressed air passes through a membrane dryer bundle 37, which is housed within a membrane dryer bowl or shell 60. The membrane dryer bundle 37, which may be wound helically, is specifically designed to remove water vapor and in one embodiment of the present invention, may be comprised of a bundle of hollow fibers.

A water vapor partial pressure differential is present between the inside of the membrane dryer hollow fibers 37 and the outside of the membrane dryer hollow fibers 37, so that water vapor will migrate to the outside of the hollow fibers 37. Thus, as the compressed air passes through the inside of the membrane fibers, the water vapor is absorbed on the inside of the fiber wall and passes quickly through the walls of the fiber to the outer portion of the membrane fibers 37. The dryer 15 is driven by the water vapor partial pressure differential between the inside and outside of the hollow membrane fibers. To continuously dry the gas stream, the outer layers of the membrane fibers 37 must be purged (swept) of water vapors using a sweep stream, as further discussed below.

The bulk of the dry air travels up through a transfer tube 65 and leaves the dryer 15 through the membrane head 55. The product dry air then enters the catalyst filter 20. The catalyst filter 20 converts carbon monoxide (CO) in the presence of oxygen ($O_2$) to carbon dioxide ($CO_2$). The chemical reaction for this conversion is $2CO+O_2 \rightarrow 2CO_2$. The catalyst inlet stream must be dry for the catalyst filter 20 to remove CO from the stream. To monitor the inlet, a moisture indicator 70 is located at the head 73 of the catalyst filter housing 74. The moisture indicator 70 tests the catalyst filter 20 inlet stream using an indicator gel, which is green when stream is dry and turns yellow in the presence of moisture. The dry stream continues into a catalyst bed 75, which removes CO. End pieces 77 hold the cartridge encasing the catalytic bed 75 within its housing 79. The purified air stream exits the catalytic bed 75 via outlet holes in the bottom end piece 77. The bulk of the purified air then exits the head 73 of the catalyst filter 20. In some embodiments of the invention, a plugged port 93 may be included within the head of the catalyst filter 20 for the optional addition of a conventional CO monitoring device (not shown).

The air stream exits the head 73 of the catalyst filter 20 and enters activated carbon filter 25. Activated carbon filter 25 includes a filter element 85 which is filled with granulated activated carbon. This filter 25 is designed to remove detectable odors, oil vapor and other organic vapors from the air stream. Lastly, the stream enters the particulate filter 30 which has a filter element 90 designed to capture any catalyst or carbon fines which may have entered the stream in the previous two filtration steps. The particulate filter 30 includes a differential pressure gage 53 to indicate when the filter element 90 needs to be replaced. The product air stream exits the BAPS through outlet stream $O_s$.

In hollow fiber membrane gas separation devices, such as membrane dryer 15, sweep gas may be used to increase the pressure differential that drives the system, improve the dryness of the product air and enhance productivity of the membrane dryer 15. The sweep air required to maintain dehydration performance of the membrane dryer 15 is taken from the bottom of the housing of the catalyst filter 20. A small portion of the product dry air is diverted through a sweep inlet tube 35, which connects the bottom of the removable housing of the membrane dryer 15 to the bottom of the catalyst filter 20.

In example embodiments of the present invention, a sweep control orifice 41 may be used for metering the appropriate amount of sweep air. A sweep filter, such as a sintered bronze filter 45, may be installed at the catalyst filter end of the sweep inlet tube 35 to assure no solid particulate can pass into the sweep air control orifice 41, potentially blocking it. A sweep center fitting 95 is designed to align with a bottom bundle cap 97. The sweep air flows throw fitting 95 and is then swept along the outer surface 99 of the membrane bundle fibers 37. A catalyst fitting 102 interlaces with the housing 74 of the catalyst filter 20 creating a fitted seal 104. An adapter fitting 105 may be used to maintain the connection between the pipe threading of the fitting 102 and the sweep inlet tube 35.

The sweep exhaust exits the bundle 37 via holes 100 and flows down to vent breather 107 which discharges the sweep exhaust into the ambient surroundings. In example embodiments of the invention, the membrane dryer 15 is housed in a "T-style" filter housing so-named because it has inlet and outlet conduits at the head of the housing and has the ability to utilize sweep air from an external source attached to the bottom of the housing. Because the sweep inlet stream is purified prior to reentering the membrane dryer 15, the sweep exhaust is substantially free of CO when it is discharged to the surrounding environment and as such, the purified sweep exhaust does not contaminate that environment.

The many features and advantages of the invention are apparent from the detailed specification, and thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

What is claimed is:

1. A breathing air purification device, comprising:
   a membrane separation component, comprising:
      a membrane having a permeate portion and a non-permeate portion;
      a membrane housing which encases the membrane;
      a membrane feed inlet conduit connected to the membrane; and
      a non-permeate gas outlet conduit fluidly connected to the non-permeate portion of the membrane;
   a catalyst filter component, comprising:
      a cartridge containing a bed of catalyst;
      two end pieces maintaining the cartridge within a catalyst bed housing and having outlet holes;
      a catalyst inlet conduit connected to the bed of catalyst and fluidly connected to the non-permeate gas outlet; and
      a product gas outlet conduit connected to the outlet holes; and
   a sweep inlet tube providing a gas connection from the catalyst filter component to the permeate portion of the membrane.

2. The breathing air purification device, as claimed in claim 1, further comprising a sweep orifice for metering an amount of gas which enters the permeate portion of the membrane.

3. The breathing air purification device, as claimed in claim 1, further comprising at least one pre-filter located upstream of the membrane separation component.

4. The breathing air purification device, as claimed in claim 1, further comprising a sweep inlet conduit within the membrane housing.

5. The breathing air purification device, as claimed in claim 1, further comprising a transfer tube in a center portion of the membrane for transferring a portion of the non-permeate product gas from the non-permeate portion of the membrane to the non-permeate gas outlet conduit.

6. The breathing air purification device, as claimed in claim 1, further comprising an activated carbon filter located downstream of the catalyst filter.

7. The breathing air purification device, as claimed in claim 6, further comprising a particulate filter located downstream of the activated carbon filter.

8. The breathing air purification device, as claimed in claim 1, wherein the catalyst filter includes a moisture indicator device.

9. The breathing air purification device, as claimed in claim 1, wherein the catalyst filter includes a plugged port for a carbon monoxide monitoring device.

10. The breathing air purification device, as claimed in claim 1, further comprising a filter mounting bracket attached to the membrane separation component.

11. The breathing air purification device, as claimed in claim 1, further comprising a filter mounting bracket attached to the catalyst filter component.

12. The breathing air purification device, as claimed in claim 1, further comprising a sweep filter fluidly connected to the sweep inlet tube.

13. The breathing air purification device, as claimed in claim 12, wherein the sweep filter is a sintered bronze filter.

14. The breathing air purification device, as claimed in claim 1, wherein the membrane housing incorporates a "T-style" filter housing.

15. The breathing air purification device, as claimed in claim 1, further comprising a pipe-threaded catalyst fitting which interlaces with the catalytic bed housing creating a fitted seal.

16. The breathing air purification device, as claimed in claim 15, further comprising an adapter fitting to maintain a connection between the pipe threading of the catalyst fitting and the sweep inlet tube.

17. The breathing air purification device, as claimed in claim 1, wherein a sweep gas stream, substantially free of carbon monoxide, flows from the catalyst filter component to the membrane separation component.

18. A breathing air purification device having a carbon-monoxide free sweep stream, comprising:
   membrane separation means, comprising:
      a separation means for separating a permeate portion from a non-permeate portion;
      encasement means for encasing said separation means;
      feed inlet means for carrying a feed gas into the device; and
      a non-permeate product gas outlet means for carrying non-permeate product gas out of the membrane separation means;
   catalyst filter means, comprising:
      cartridge means for encasing a bed of catalyst;
      end pieces means for maintaining the cartridge within a catalyst bed housing and having outlet means for carrying a catalyst-treated outlet gas out of the catalyst filter means; and
      catalyst inlet means for receiving non-permeate product gas from the membrane separation means and introducing the non-permeate product gas into the bed of catalyst; and
   a sweep inlet means for providing a gas connection from the catalyst filter component to the permeate portion of the membrane.

19. The breathing air purification device, as claimed in claim 18, further comprising a sweep orifice means for metering an amount of gas which enters the permeate portion.

20. The breathing air purification device, as claimed in claim 19, further comprising a sweep filter means for removing particulates from the gas which enters the sweep inlet means.

21. The breathing air purification device, as claimed in claim 18, further comprising pipe-threaded catalyst fitting means for interlacing with the catalytic bed housing forming a fitted seal.

22. The breathing air purification device, as claimed in claim 21, further comprising adapter fitting means for maintaining a connection between the pipe threaded catalyst fitting means and the sweep inlet means.

23. A method of using a breathing air purification device, comprising:
   removing water vapor from a compressed air stream using a membrane separation component, comprising:
      carrying the compressed air stream into the device;
      separating a permeate portion from a non-permeate portion of the compressed air stream; and
      carrying a non-permeate gas out of the membrane separation component;
   removing carbon monoxide from the non-permeate gas using a catalyst filter component, comprising:
      maintaining a cartridge within a catalyst bed housing end pieces having outlet holes for carrying a catalyst-treated gas out of the catalyst filter component; and
      introducing the non-permeate gas into a bed of catalyst housed within the cartridge; and
   transferring the catalyst-treated gas from the catalyst filter component to the permeate portion of the membrane via a sweep inlet conduit.

24. The method of using a breathing air purification device of claim 23, further comprising, metering an amount of gas which enters the sweep inlet conduit.

25. The method of using a breathing air purification device of claim 23, wherein the catalyst-treated gas is substantially free of carbon monoxide.

* * * * *